United States Patent [19]

Grosseau

[11] 4,033,423

[45] July 5, 1977

[54] HYDRAULIC HEIGHT-ADJUSTMENT VEHICLE SUSPENSION

[75] Inventor: Albert Grosseau, Paris, France

[73] Assignee: Societe Anonyme Automobiles Citroen, Paris, France

[22] Filed: Nov. 17, 1975

[21] Appl. No.: 632,721

[30] Foreign Application Priority Data

Nov. 25, 1974 France .......................... 74.38567

[52] U.S. Cl. .......................... 180/41; 280/6 H; 280/707

[51] Int. Cl.² .......................... B60G 17/00

[58] Field of Search .......... 180/41; 280/6 R, 6 H, 280/6.1, 707, 709, 710

[56] References Cited

UNITED STATES PATENTS

| | | | |
|---|---|---|---|
| 2,694,581 | 11/1954 | Helme | 180/41 |
| 2,706,009 | 4/1955 | Schramm | 180/41 |
| 3,171,556 | 3/1965 | Brekelbaum | 180/41 |
| 3,814,200 | 6/1974 | Hirst | 180/41 |
| 3,829,119 | 8/1972 | Kirschner et al. | 280/6 H |

Primary Examiner—Robert R. Song
Assistant Examiner—J. D. Rubenstein
Attorney, Agent, or Firm—Wenderoth, Lind & Ponack

[57] ABSTRACT

Hydraulic height-adjustment vehicle suspension system includes an arrangment for blocking up the suspension and adapted to prevent the collapsing thereof when the vehicle is kept stationary for a prolonged time period. The blocking arrangement includes a buffer member retractable and engageable in the fashion of a chock or the like, between a movable member of the suspension system and a fixed portion of the body or chassis of the vehicle. Preferably, a control for each buffer member includes a hydraulic receiver operating against the force of a return spring urging the buffer member to its retracted position, and a hydraulic chamber is provided which communicates with the receivers and is urged to its hydraulic fluid delivering condition by the actuation of the hand brake control of the vehicle to its brake applying position.

5 Claims, 7 Drawing Figures

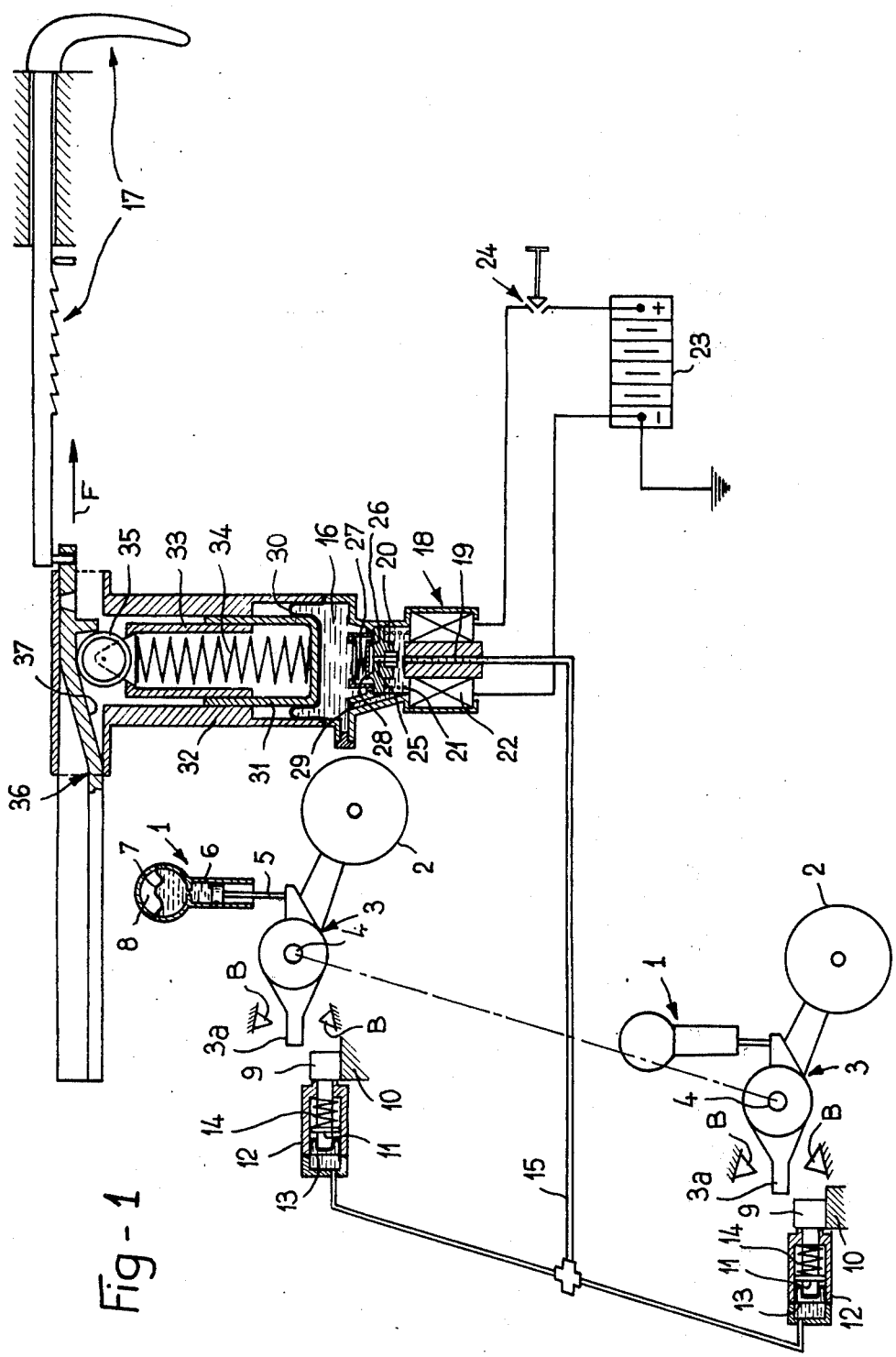

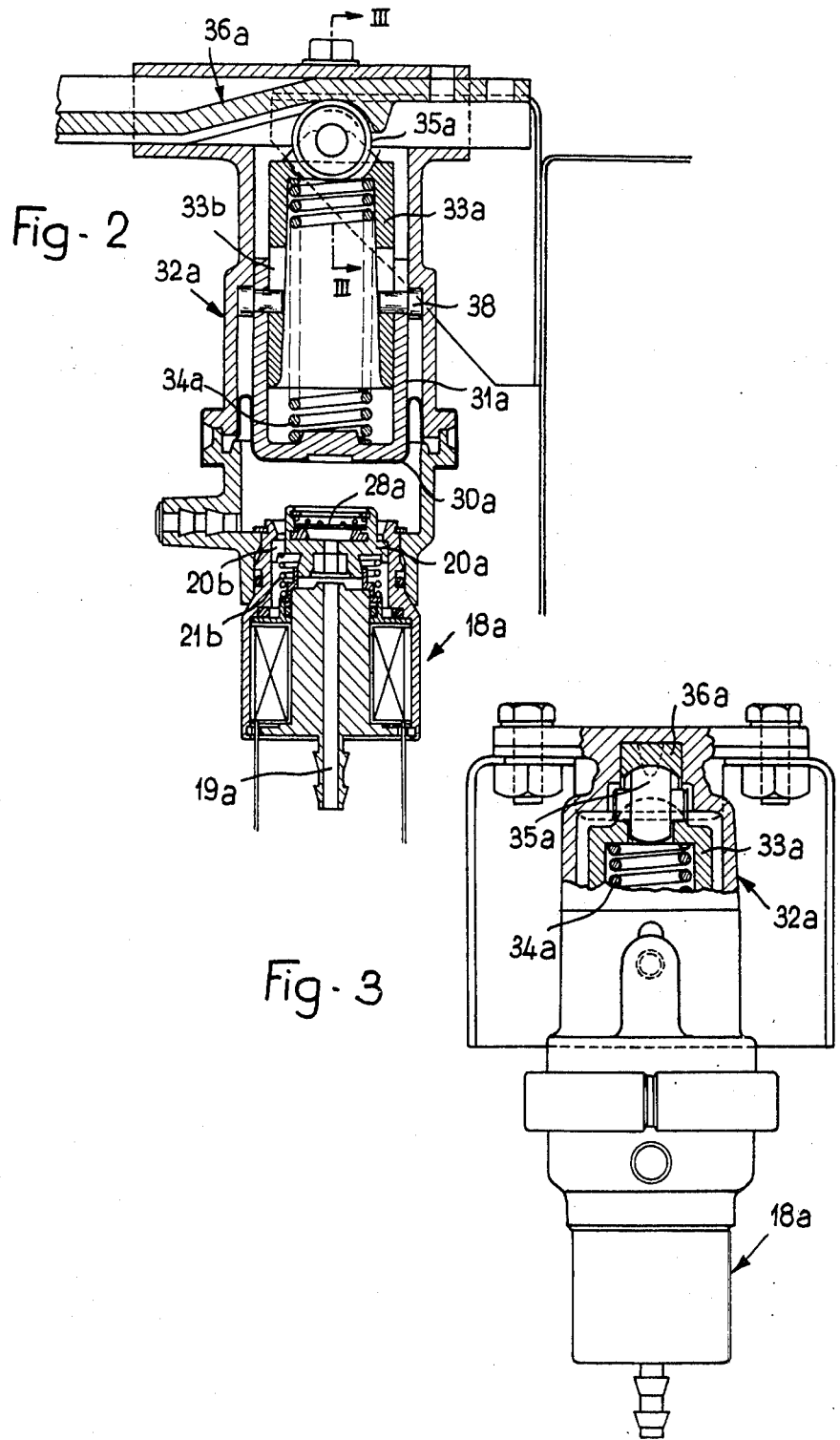

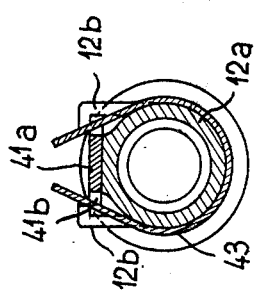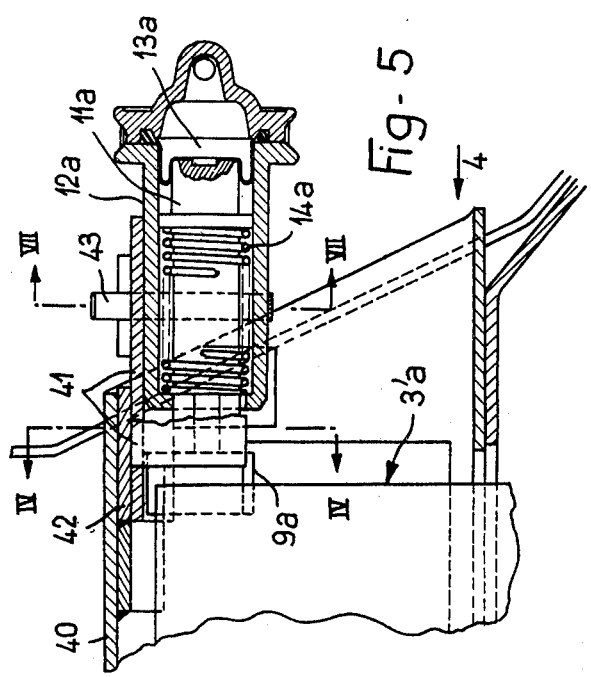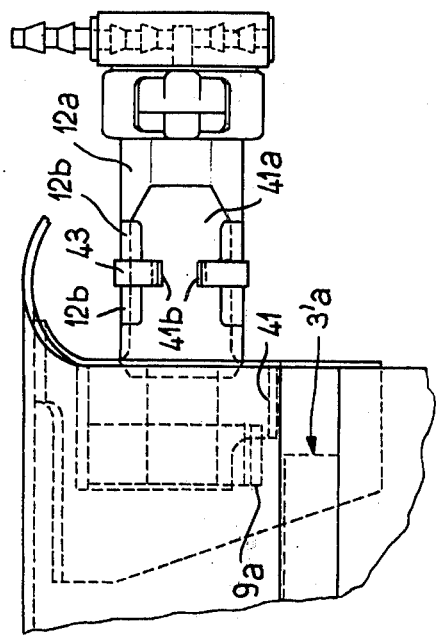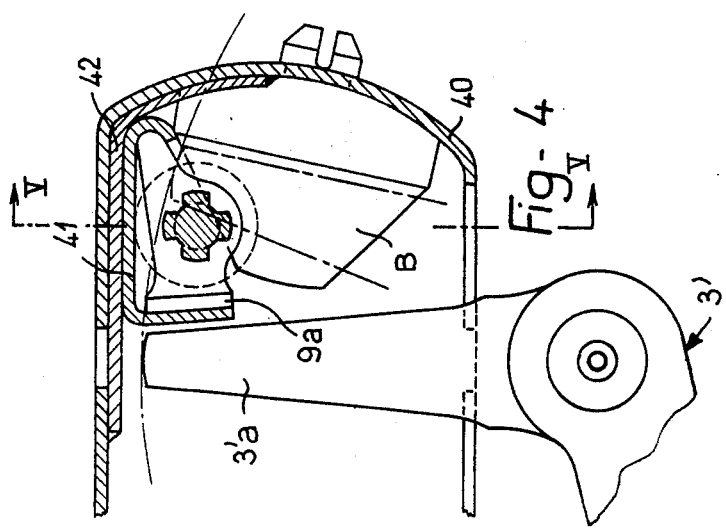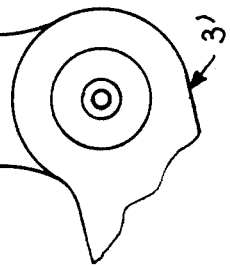

HYDRAULIC HEIGHT-ADJUSTMENT VEHICLE SUSPENSION

BACKGROUND OF THE INVENTION

This invention relates in general to suspension systems of motor vehicles, of the type automatically providing hydraulic adjustment of the vehicle height or gound clearance, and wherein the spring proper may be of pneumatic or metallic construction.

In many countries traffic regulations require that vehicle bumpers be kept at a minimum height above the road surface. Now, with a suspension system of the type broadly defined here-inabove and after prolonged standing of the vehicle, the unavoidable hydraulic leakages cause the suspension to yield or collapse and therefore the bumpers to assume a position below the minimum prescribed level.

A known proposition for solving this problem consisted in providing means for blocking up the suspension system, which comprised a special insert adapted to be locked, notably in the form of a pawl and ratchet device, but this may be regarded as scarcely suited for the purpose, due to the considerable stress implemented, not to mention manufacturing cost and reliablility factors.

SUMMARY OF THE INVENTION

It is the primary object of the present invention to provide an improved solution to the above-defined problem which is characterised in that the means for blocking up the supension system under parking or similar conditions include buffer members each adapted to be retracted and engaged in the fashion of a lock-bolt or chock between a movable suspension member and a fixed portion of the vehicle body or chassis.

According to a preferred embodiment of this invention the control means associated with the buffer members comprise for each buffer member a hydraulic actuator incorporating spring means for urging the buffer member to its retracted position, and a hydraulic chamber communicating with the hydraulic actuators of the system and adapted, when the vehicle hand brake control lever is moved to its braking position, to force hydraulic fluid into the actuators as to move the buffer members to their operative position.

BRIEF DESCRIPTION OF THE DRAWINGS

Other features and advantages of the suspension system with the hydraulic height adjustment feature according to this invention will appear as the following description proceeds with reference to the attached drawings, in which:

FIG. 1 is a diagrammatic view illustrating with parts broken away a typical arrangement for controlling the blocking up of the suspension members of hydropneumatic wheels of a motor vehicle;

FIG. 2 is a detail view showing in axial section the control device, the hydraulic chamber and a solenoid valve associated therewith;

FIG. 3 is another detail and fragmentary view showing a part-section taken along the line III—III of FIG. 2;

FIG. 4 is a side elevational and sectional view, as seen in the direction of the arrow 4 of FIG. 5, of one end of a wheel suspension arm which is adapted to be engaged by a retractable buffer member, the section being taken along the line IV—IV of FIG. 5;

FIG. 5 is a section taken along the line V—V of FIG. 4;

FIG. 6 is a plan view from above of the components shown in FIG. 5, and

FIG. 7 is a detail view showing in cross section taken along the line VII—VII of FIG. 5 a detail of the same assembly.

DETAILED DESCRIPTION OF THE INVENTION

The vehicle suspension system shown diagrammatically in FIG. 1 for illustrating the principles of the present invention is intended for a well-known type of train of independent wheels which comprises hydropneumatic blocks 1.

Each road wheel 2 is carried by a wheel arm 3 pivoted at 4 to the body of chassis of the vehicle, and this wheel arm 3 is connected to the piston rod 5 of a hydraulic suspension cylinder 6 constituting one of the components of the system for adjusting the height or trim of the body, the hydraulic fluid chamber of this cylinder 6 being separated by means of a flexible membrane 7 from a gas-filled chamber 8 constituting the suspension sphere substituted for the conventional spring, it being understood that the body of each hydropneumatic block 1 is rigidly secured to the vehicle body or chassis. The hydraulic cylinders 6 of this train of wheels are usually supplied with hydraulic fluid in the well-known manner via a correcting device (not shown) consisting of a valve responsive to the ground clearance of the vehicle body, in order to keep the height at a constant value in the static condition of the vehicle.

To prevent the collapsing of the vehicle suspension system under prolonged parking conditions, as a consequence of unavoidable leakages in the hydraulic system, there is provided in the above-described assembly, for each wheel suspension assembly, a retractable buffer member 9 adapted to be interposed, when the vehicle is brought to a standstill, between a buffer arm 3a rigid with the wheel carrier arm 3 and a rigid bearing portion 10 of the vehicle body or chassis, buffer arm 3a consisting in this example of the member usually provided for co-acting with the conventional rubber buffers B limiting the permissible beats of the suspension arms.

Each retractable buffer member 9 is rigid with a push-rod 11 slidably mounted in a cylinder 12 secured to the body or chassis. This push-rod 11 is responsive to the opposed actions of a hydraulic receiver 13 incorporating a flexible diaphragm and a return spring 14 constantly urging the retractable buffer member 9 to its retracted position.

The hydraulic receivers 13 are interconnected by a pipe line connected in turn via a line 15 to chamber 16 in which the hydraulic fluid is adapted to be forced towards the receivers 13 when the hand brake control lever 17 is moved to its braking position.

In this example the pair of receivers 13 of the train of wheels are connected in parallel, but it is clear that a series connection therebetween could be provided as well, the same arrangement being contemplated for the other train of wheels of the vehicle if this other train of wheels is also equipped with hydropneumatic blocks or the like.

Disposed between the hydraulic chamber 16 and pipe line 15 is a solenoid poppet valve 18. This valve 18 comprises a core formed with an axial passage 19 adapted to be isolated by a poppet 20 urged to its passage opening position by a coil spring 21, poppet 20 closing passage 19 when the solenoid coil 22 is energized.

This coil 22 is adapted to be supplied with energizing current from the storage battery 23 of the vehicle via a conventional engine ignition switch 24.

The poppet 20 is also formed with an axial passage 25 and comprises a seat-forming portion 26 adapted to be closed by a spring 27 engaging another poppet valve 28, the force of spring 27 being such that, under certain conditions, as will be explained presently, the hydraulic fluid is allowed to return in the direction from receiver 13 to chamber 16.

When valve 20 is open a normal communication is established between chamber 16 and the passage 19 connected to pipe line 15, this communication being provided (see FIG. 1) via a passage 29 parallel to the cavity guiding the poppet valve 20.

The chamber 16 is closed by a flexible diaphragm 30 responsive to a piston 31 slidably mounted in a body 32 secured to the chassis or body of the vehicle and also rigid with the solenoid valve body. Slidably mounted in turn in piston 31 is a push-rod 33 co-acting piston 31 through the medium of a coil compression spring 34 disposed therebetween.

The push-rod 33 carries at its outer end a roller follower 35 engaging a control actuator or cam 36 consisting of a suitably shaped rod slidably mounted in a bore of body 32 and coupled to the hand brake control lever 17 shown in its brake-release position in FIG. 1. The aforesaid cam 36 is formed with an inclined face 37 adapted to force the roller follower 35 inward and thus compress the spring 34 when the hand-brake control lever 17 is pulled to its brake-applying position as shown in FIG. 1, i.e. in the direction of the arrow F.

The control means for blocking up the suspension system according to this invention operates as follows:

When the vehicle is driven and subsequently brought to a standstill, the driver cuts off the ignition switch 24 before applying the hand brake and the assembly is in the position shown in FIG. 1, i.e. with, inter alia, the movable buffer members 9 retracted by the force of their corresponding return springs.

When the hand brake control lever 17 is pulled in the direction of the arrow F to apply the brakes, the cam face 37 forces the roller follower 35 of push-rod 33 inwards and this push-rod 33, via spring 34, moves the piston 31 and diaphragm 30 to force the liquid out from chamber 16 through the parallel passage 29 and axial passage 19 of the open solenoid poppet valve 18 into the pipe line 15 and eventually the hydraulic receivers 13.

Therefore, actuating the hand brake will tend to move the buffer members 9 on the bearing surface of member 10 to a position interfering with the path of the corresponding buffer arm 3a of the wheel carrier arm assembly 3. This engagement between each buffer member 9 and the relevant bearing surface 10 takes place freely in the position of the suspension system which corresponds to the normal height or ground clearance of the vehicle, as obtained when the vehicle is driven or has just been driven, for it is only after a certain time after the vehicle has been brought to a standstill and as a consequence of hydraulic leakages as mentioned hereinabove that the buffer arms 3a will engage the corresponding buffer members 9 and thus prevent any undesired further collapsing or yielding of the vehicle suspension. It will be seen that the order in which the hand brake is actuated and the ignition switch 24 is cut off is immaterial, for if the switch is not turned off before applying the hand brake the solenoid valve 18 remains closed but the spring 34 is compressed during the brake application and the chamber 16 constitutes a hydraulic pressure accumulator and will become operative as described hereinabove to set the buffer members 9 in position when the switch 24 is actuated and thus caused to open the solenoid valve 18.

Should at least one buffer member 9 be prevented from being engaged as a consequence of the momentary position of the buffer arm 3a, for example when the vehicle is stopped along a considerably canted road (i.e. a road inclined in the transverse direction), it will be seen that this condition can by no means prevent the other buffer members from positioning themselves since in this arrangement they are controlled hydraulically, and that if as a consequence of the unloading of the vehicle, for instance, the aforesaid buffer member clears the buffer arm engagement passage, this buffer arm will also assume the proper position as a consequence of the accumulating action of chamber 16.

When re-starting the vehicle engine, closing the ignition switch 24 will close the solenoid valve 18 by energizing the coil thereof, but on the other hand releasing the hand brake will release the spring 34. Under these circumstances, if the buffer members 9 are not urged against their bearing members 10 by the relevant buffer arm 3a, or when they are no longer urged by the relevant buffer arm 3a as a consequence of the recharging of the cylinders 6 by means of the hydraulic correcting device provided in the suspension system for restoring the normal height of the vehicle, their return springs 14 will restore them to the retracted position, as illustrated in FIG. 1, by forcing the hydraulic fluid from the corresponding receiver 13 towards the chamber 16, thus opening the calibrated poppet 28 therein to permit the ingress of the corresponding volume of fluid into this chamber and allowing the components 31, 33, 34 and 35 to resume their initial positions shown in FIG. 1. Also in this case the order in which the hand brake control lever 17 and the ignition switch 24 are actuated is immaterial.

It will be noted that during the operation of the vehicle, while the engine is running, the hand brake control 17 can be actuated both when the vehicle is stationary and when it is being driven, without inasmuch inserting the buffer member 9 inbetween the arm 3a and bearing member 10, for under these conditions the solenoid coil 22 is energized and the poppet valve 20 is seated, the only consequence of a hand brake control actuation being the compression of spring 34 and the building up of liquid pressure in chamber 16.

It will be seen that should hydraulic leakages occur in the circuit controlling the buffer members 9 these members could not be actuated untimely since they are normally urged by their springs to their retracted position.

Likewise, an electric failure cannot cause by itself the actuation of buffer members 9, since such actuation can only take place when, in addition, the hand brake control 17 has been pulled intentionally.

FIGS. 2 and 3 illustrate a typical embodiment of an assembly incorporating the solenoid valve, the hydraulic chamber and the brake control means. In these Figures, the components identical with or similar to those of FIGS. 1 are designated by the same reference numerals to which the index "a" is added. The fluid passage 29 is embodiment as an equivalent passage 20b provided in the outer periphery of the bore guiding the poppet 20a in its cavity.

Moreover, the piston 31a and push-rod 33a are now prevented from rotating by the presence of lateral studs 38 having integral heads engaging axial internal grooves formed in the body 32a, studs 38 engaging the one hand, without play, apertures formed to this end through the wall of piston 31a and on the other hand elongated holes 33b formed in push-rod 33a to enable this push-rod to compress the spring 34a.

It is also apparent from FIGS. 2 and 3 that cam member 36a is guided in the body 32a and has a contour engaging or wrapping about one-third of the periphery of roller follower 35a urged thereagainst by spring 34a.

FIGS. 4 to 7 inclusive illustrate likewise a practical embodiment of a hydraulic receiver with the corresponding retractable buffer member, these two last-mentioned components being secured to a support 40 for the fixed suspension buffers B in which a buffer member 3'a rigid with the wheel carrier arm 3' is adapted to move. The other members corresponding to those of FIG. 1 are designated by the same reference numerals with in addition the index letter a. The cylinder 12a on the diaphragm-type hydraulic receiver 13a is detachably mounted on a support 41 welded to a mounting platform 42 welded in turn to support 40.

This support 41 has a lug 41a in which notches 41b are formed to permit the axial locking of the cylinder 12a by means of a spring clip 43 engaging notches 41b and also bosses 12b formed on cylinder 12a.

The support 41 also has a bore for guiding the buffer member 9a as clearly shown in FIG. 4, this buffer member 9a being shown in its operative position in FIGS. 5 and 6.

Although specific embodiments of this invention have been described hereinabove and illustrated in the attached drawings, it will readily occur to those skilled in the art that various modifications and changes may be made thereto without departing from the scope of the invention as set forth in the appended claims.

What is claimed as new is:

1. In a vehicle of the type including a chassis, a hand brake control operably movably from a non-brake applying position to a brake applying position, a suspension system including at least one suspension member movable with respect to said chassis, and means for blocking-up said suspension system to prevent said suspension system from collapsing when the vehicle is stationary for a prolonged period of time; the improvement wherein said blocking-up means comprises:

a retractable buffer movable from a first retracted position to a second blocking position between a portion of said chassis and said suspension member;

first spring means urging said buffer to said retracted position;

hydraulic receiver means, acting against the force of said spring means, for receiving therein hydraulic fluid and for moving said buffer against said first spring means into said blocking position;

a hydraulic control chamber having therein hydraulic fluid and being in fluid communication with said receiver means;

a movable member mounted in said control chamber;

second spring means, mounted between said movable member and said hand brake control, for biasing said movable member into said control chamber against said hydraulic fluid within said control chamber; and actuator means, operably associated with said hand brake control, for, upon movement of said hand brake control to said brake applying position thereof, moving said second spring means and thereby said movable member toward said control chamber, thereby forcing hydraulic fluid from said control chamber into said receiver means, and thus moving said buffer against said force of said first spring means into said blocking position, said vehicle further including an ignition circuit having an ignition switch, and further comprising a solenoid valve positioned between said control chamber and said receiver means, said solenoid valve having a coil which is part of said ignition switch circuit of the vehicle, said solenoid controlling the flow of hydraulic fluid between said control chamber and said receiver means.

2. The improvement claimed in claim 1, said solenoid valve including first poppet valve means for opening communication between said control chamber and said receiver means, said first poppet valve means being actuatable by closing said ignition switch, and a calibrated second poppet valve means, opening in a direction from said receiver means to said control chamber, for controlling the return of hydraulic fluid from said receiver means to said control chamber.

3. The improvement claimed in claim 1, wherein said actuator means comprises a push rod guided for movement by said movable member and bearing against said second spring means, a follower carried by said push rod, and a cam surface on said hand brake control and bearing against said follower.

4. The improvement claimed in claim 1, wherein said vehicle further includes limiting buffer means for limiting the extent of movement of said suspension member, said retractable buffer being mounted on a support of said limiting buffer means.

5. The improvement claimed in claim 4, wherein said retractable buffer, said first spring means and said receiver means are formed as a unitary assembly removably mounted on said support.

* * * * *